(12) United States Patent
Desai et al.

(10) Patent No.: US 8,405,505 B2
(45) Date of Patent: Mar. 26, 2013

(54) POWER MANAGEMENT OF SENSORS WITHIN A MOBILE DEVICE

(75) Inventors: Ashish Nagesh Desai, San Diego, CA (US); Ricky W. Yuen, Saratoga, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 12/786,213

(22) Filed: May 24, 2010

(65) Prior Publication Data

US 2010/0302028 A1    Dec. 2, 2010

Related U.S. Application Data

(60) Provisional application No. 61/181,225, filed on May 26, 2009.

(51) Int. Cl.
*G08B 1/08* (2006.01)
(52) U.S. Cl. .................. 340/539.3; 340/539.1; 340/500
(58) Field of Classification Search ............... 340/539.3, 340/539.1, 500
See application file for complete search history.

(56) References Cited

U.S. PATENT DOCUMENTS

| | | | |
|---|---|---|---|
| 5,964,701 A * | 10/1999 | Asada et al. | 600/300 |
| 6,243,626 B1 * | 6/2001 | Schanin | 700/286 |
| 2005/0164633 A1 | 7/2005 | Linjama et al. | |
| 2007/0214374 A1 | 9/2007 | Hempstead et al. | |

FOREIGN PATENT DOCUMENTS

WO    WO03098851    11/2003

OTHER PUBLICATIONS

International Search Report and Written Opinion—PCT/US2010/036219, International Search Authority—European Patent Office—Sep. 10, 2010.

* cited by examiner

*Primary Examiner* — Travis Hunnings

(57) ABSTRACT

Apparatuses and methods are provided for managing power consumption of a plurality of sensors within a mobile device. A method may include receiving a request from a sensor client regarding a sensor, determining whether the sensor client requested registration/deregistration, controlling a power supply and an operational mode of the sensor, based upon the registration/deregistration request, for reducing power consumption of the sensor, determining whether the sensor client provided a start/stop request for data from the sensor, and controlling power to the sensor, a device/driver configuration, and an operational mode of the sensor, based upon the start/stop request for data, for reducing the power consumption of the sensor. An apparatus may include a processor, a power supply coupled to the processor, a sensor coupled to the power supply, and a memory coupled to the processor, wherein the memory comprises instructions for causing the processor to execute the aforementioned method.

32 Claims, 10 Drawing Sheets

POWER MANAGEMENT OF SENSORS WITHIN A MOBILE DEVICE

CLAIM OF PRIORITY UNDER 35 U.S.C. §119

The present Application for Patent claims priority to Provisional Application No. 61/181,225 entitled "SENSORS BASED POWER MANAGEMENT" filed May 26, 2009, and assigned to the assignee hereof and hereby expressly incorporated by reference herein.

FIELD OF DISCLOSURE

The embodiments of the disclosure relate generally to power management for mobile devices, and more specifically, to managing the power consumption of one or more sensors utilized within a mobile device.

BACKGROUND

Modern mobile devices are rapidly becoming sophisticated sensor platforms in addition to having both communications and media rendering functionality. With the increasing popularity of advanced high-speed wireless services that leverage their capabilities, the daily usage time of mobile devices will continue to increase. As users become more accustomed to anytime/anywhere high speed data network access, the battery life of mobile devices may be a driving factor in determining this usage time. Consequently, the battery life will likely rise in importance as one of the major selling points for individuals making purchasing decisions.

In addition to improvements in battery technology, current efforts to extend battery life focus around various aspects of the design of mobile devices affecting battery consumption. Examples of such efforts can include improvements in the energy efficiency of radio-frequency (RF) components, displays, and digital electronics including various processors and logic circuits.

In parallel to these endeavors, there may be additional room for battery life improvement by managing the power consumption of the sensors utilized within the mobile device. The sensors may include one or more sensors for imaging, positioning, relative motion determination, user-proximity, ambient light determination, user-input, noise cancellation, etc.

Given the increasing number of sensors within the mobile device, and the fact that certain types of sensors may draw a relatively significant amount current (e.g., CCD image sensors), it would be beneficial to implement techniques for managing sensor power consumption, and thus extend the operational time of the battery within a mobile device.

SUMMARY

Exemplary embodiments of the invention are directed to systems and method for managing power consumption of within a mobile device. In one embodiment, a method for managing power consumption of a plurality of sensors is provided. The method may include receiving a request from a sensor client regarding a sensor, and determining whether the sensor client requested registration/deregistration. The method may further include controlling a power supply and an operational mode of the sensor, based upon the registration/deregistration request, for reducing power consumption of the sensor, and determining whether the sensor client provided a start/stop request for data from the sensor. The method may further include controlling power to the sensor, a device/driver configuration, and an operational mode of the sensor, based upon the start/stop request for data, for reducing the power consumption of the sensor.

In another embodiment, an apparatus for managing power consumption of at least one sensor within a mobile device is provided. The apparatus may include a processor, a power supply coupled to the processor, at least one sensor coupled to the power supply, and a memory coupled to the processor. The memory may include instructions for causing the processor to receive a request from a sensor client regarding a sensor, and determine whether the sensor client requested registration/deregistration. The instructions may further cause the processor to control a power supply and an operational mode of the sensor, based upon the registration/deregistration request, for reducing power consumption of the sensor. The instructions may further cause the processor to determine whether the sensor client provided a start/stop request for data from the sensor, and control power to the sensor, a device/driver configuration, and an operational mode of the sensor, based upon the start/stop request for data, for reducing the power consumption of the sensor.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
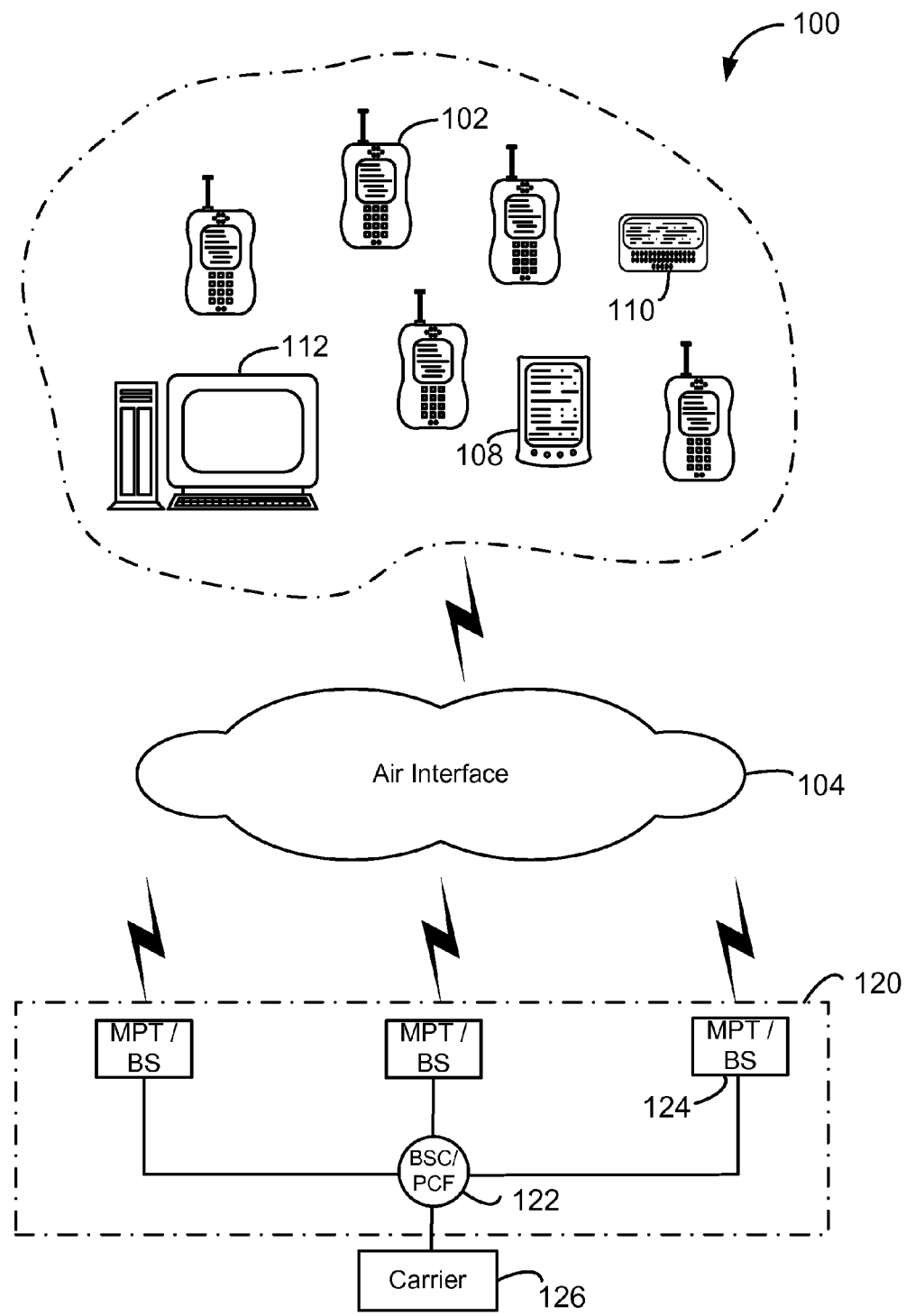
FIG. 1 is a diagram of a wireless network architecture that supports access terminals and access networks in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, a mobile device may be any type portable computational device having at least one sensor, and resources for processing the sensor data into useful information. Controlling a plurality of sensors may be facilitated by an architecture which includes a sensor processor system. The sensor processor system may task and coordinate different sensors based upon multiple requests from applications running on the mobile device. The sensor subsystem may also control the power to each individual sensor to manage their power draw and reduce unnecessary power consumption. Embodiments presented below illustrate the details of the architecture and processes which can be used to reduce power consumption and improve the battery life of the mobile device.

In various embodiments, the mobile device may also have networking capabilities, and be utilized as an access terminal (AT) as described below in FIGS. 1-3.

FIG. 1 illustrates a block diagram of one exemplary embodiment of a wireless system 100 in accordance with at least one embodiment of the invention. With this embodiment, the mobile device includes networking capabilities, and can be thought of as High Data Rate (HDR) subscriber station, referred to herein as an access terminal (AT). The AT may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Further referring to FIG. 1, system 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

The components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
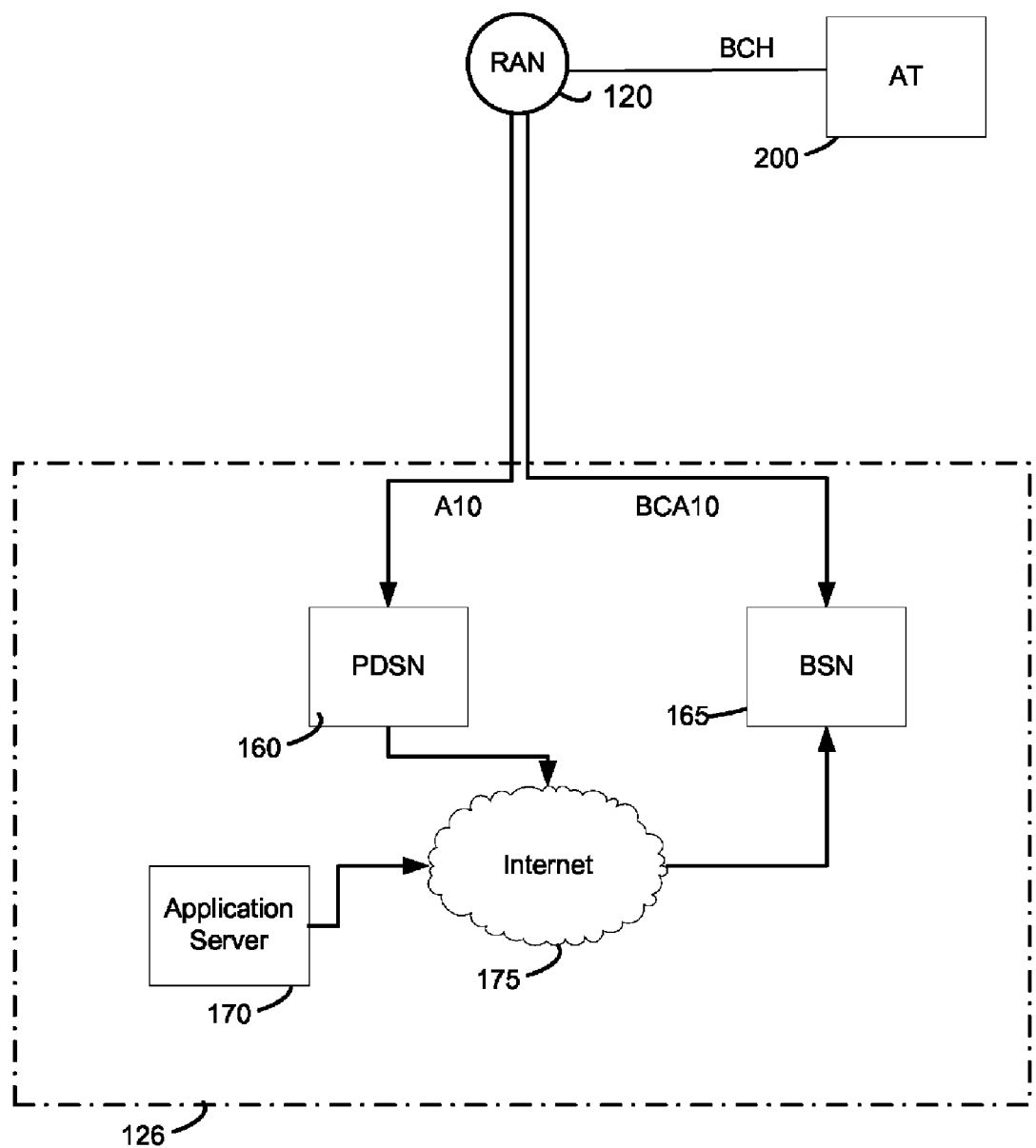
FIG. 2 illustrates an exemplary network and various elements therein according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Further referring to FIG. 2, the broadcast serving node (BSN) 165 may be configured to support multicast and broadcast services. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175. Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
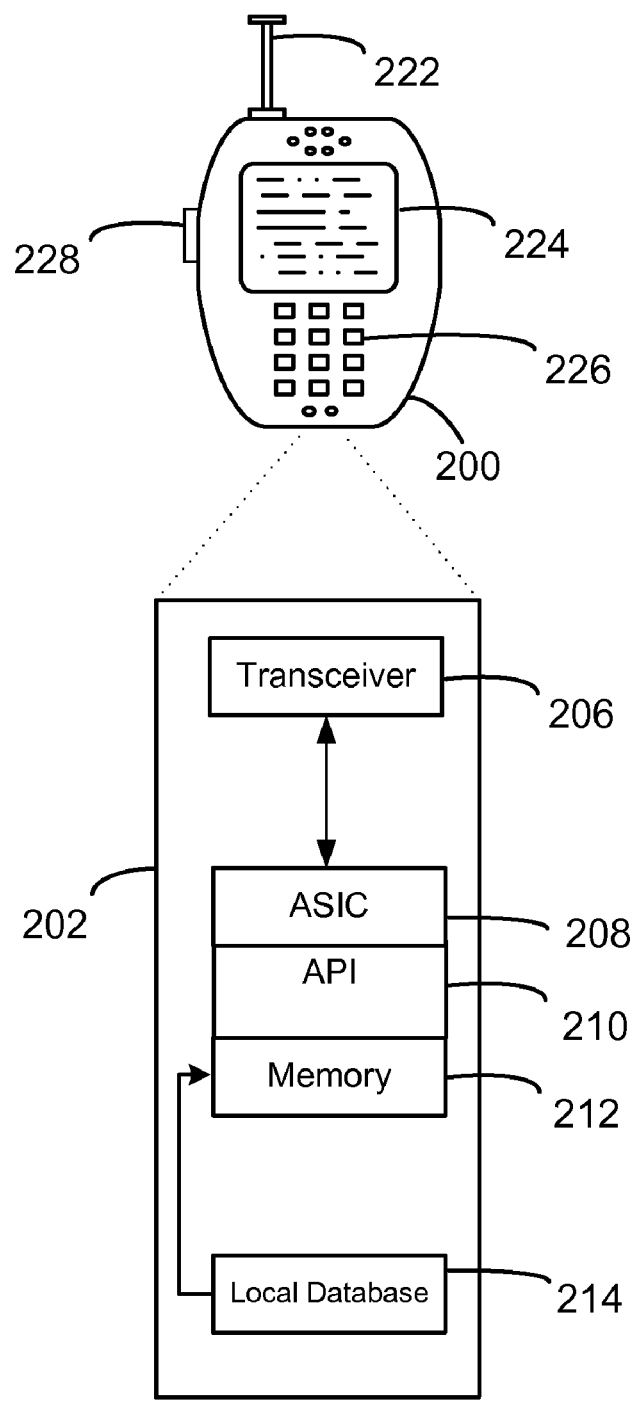
FIG. 3 is an illustration of a mobile device in accordance with at least one embodiment of the invention.

Referring to FIG. 3, an access terminal 200, (in this embodiment a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

As discussed above, properly managing power can be desirable feature for mobile devices (e.g., cell phones, MP3 players, wireless mobile access terminals, non-wireless mobile access terminals, etc.). There may be a number of different mechanisms in conventional access terminals for managing power consumption. Some mobile devices may enter a low-power mode, or sleep mode, when no applications are being executed. Other mobile devices may have more sophisticated power management mechanisms whereby the amount of power consumed scales with the processing load of the respective mobile device. However, conventional mobile devices do not have the finer-grain capability to adjust power modes which may be available within individual sensors residing within the mobile device. Embodiments of the invention are thereby directed to selectively controlling power applied to individual sensors based upon software control.

Figure 4A:
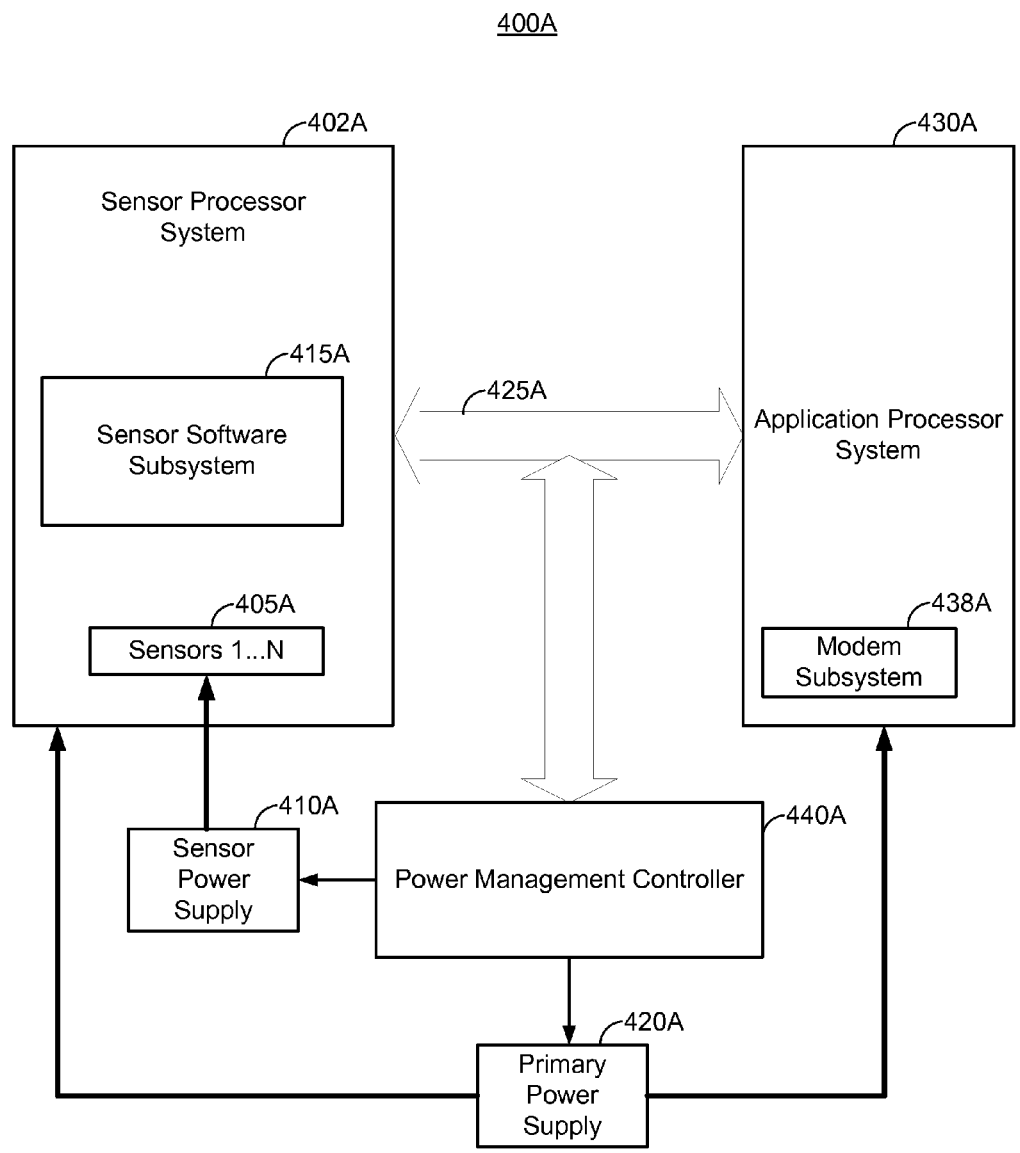
FIG. 4A depicts a top-level block diagram of a mobile device consistent with an embodiment of the invention.

FIG. 4A depicts a high-level block diagram of an exemplary mobile device architecture 400A consistent with an embodiment of the invention. Referring to FIG. 4A, the mobile device 400A (which may also serve as an access terminal in this embodiment) may include a sensor processor system 402A, an application processor system 430A and a power management controller 440A. The mobile device may further include one or more power supplies (e.g., sensor power supply 410A and MSM power supply 420A) which may be controlled by the power management controller 440A. The sensor processor system 402A may include a plurality of sensors 1 . . . N, 405A, and a sensor software subsystem 415A. While not shown explicitly in FIG. 4A, the sensor processor system may include sensor processor that is configured for low-power operation, and consumes significantly less power than an application processor residing within the application processor system. The sensor processor interacts (e.g., tasks various sensors and receives sensor data) with sensors 1 . . . N, 405A, and executes the modules within the sensor software subsystem 415A (shown in more detail in FIG. 5).

The sensor processor system 402A can be maintained in an 'on'-state even when the application processor system is in a sleep state. Components within the sensor processor system 400A can have one or more low-power modes. The sensor processor may have various power modes (i.e., low-power, sleep, normal, etc.) and may control the power states of each sensor 1 . . . N, 405A, depending upon their power control capability. For example, in one low-power mode, the sensor processor of the sensor processor system 400A can be in a dormant state but can be configured to wake-up when an interrupt from one of the sensors 405A provides data. In another example, a subset of sensors 405A can be completely powered down in the dormant state by the sensor software subsystem 415A, but one or more sensors (e.g., such as an accelerometer) can remain active, while in a low power consumption state, to provide interrupts for waking up the sensor processor system 400A. The sensor processor system 400A can also be placed in duty cycle mode such that the sensor processing system 400A will periodically wake up to check one or more of sensors 405A. Thus, while the sensor processor system 400A is maintained in an 'on' state, this is not intended to imply that each of sensors 405A are used constantly and/or that the sensor process is active continuously. The sensor processor system 402A may be connected to both the application processor system 430A and/or modem subsystem 438A and the power management controller 440A via a connection 425A, which can be a single bus, multiple buses and/or other types of connection pathways. Additionally, in order to control the power states of the sensors 405A, a separate sensor power supply 410A may be used, which can be independently controlled by power management controller 440A. A separately controlled primary power supply 420, which may also be controlled by power management controller 440A, can provide power to other portions of the sensor processor system 415A and the application processor system 430A.

The sensor software subsystem may contain software clients specifically tailored to specific sensor devices to take advantage of their individual power control features. Sensor APIs may be used as an intermediate layer between the clients and the sensor management software. Each of these software modules may be executed one or more processors residing within the sensor processor system 402A. For example, APIs that do not require a high amount of processing resources may be offloaded to the sensor processing system 400A, which may have a lower-power processor than the application processor system 430A. In another example, sensor-specific APIs (e.g., a pedometer API that counts the steps of the user when walking/jogging, etc.) could be offloaded to the sensor processor system 400A since the sensor processor system 400A is already monitoring sensors 1 . . . N. Details of the sensor software subsystem 415A are presented below in FIG. 5). Generally, APIs are executed by the application processor system 430A, with the sensor processing system 400A configured to control/monitor for sensor activity and then take appropriate action.

The application processor system 430A includes the hardware and/or software associated with executing APIs on the mobile device, and can also include hardware and/or software related to wireless communications (e.g. modem hardware, an antenna, etc.) allowing the mobile device to serve as an access terminal when configured for wireless connectivity. Accordingly, the application processor system 430A is shown in FIG. 4A as including a modem subsystem 438A, which corresponds to the software and/or hardware related to wireless connectivity for the access terminal In an embodiment, the modem subsystem 430A can optionally be omitted from the access terminal if the access terminal is not configured for wireless communications.

The power management controller 440A controls the power consumption of the application processor system 430A and/or the modem subsystem 438A, by further controlling one or more power supplies (e.g., sensor power supply 410A and primary power supply 420A). For example, the power management controller 440A can selectively turn on or off specific hardware of the application processor system 430A, such as the modem hardware. The power management controller 440A can also scale the power consumption of specific hardware in the application processor system 430A either up or down. For example, the voltage applied to the application processor can be increased or decreased to manage the power consumption of the application processor system 430A Also, the clock signal applied to hardware in the application processor system 430A can be increased or decreased to control the speed of execution of the application processor system 430A, which in turn controls its power consumption.

The power management controller 440A can work in conjunction with the application processor system 430A and the sensor processor 402A to facilitate aspects of power management functionality used within the mobile device 400A. For example, the power management controller 440A can allow the application processor sleep longer by leveraging information provided by the sensor processor system 402A.

Sensor derived information may be processed and provided by the sensor software subsystem 415A, and then conveyed to the power management controller 440A via the connection 425A. However, the power management controller 440A can also override the selected power profile from the sensor processor system, such as when the application processor system 430A informs the power management controller 440A that its power requirements have changed (e.g., a user has requested a shut down or loading of one or more APIs through the application processor system 430A, etc.). Moreover, the sensor software subsystem may have the power management controller selectively control the power to individual sensors 405A through sensor power supply 410A.

Figure 4B:
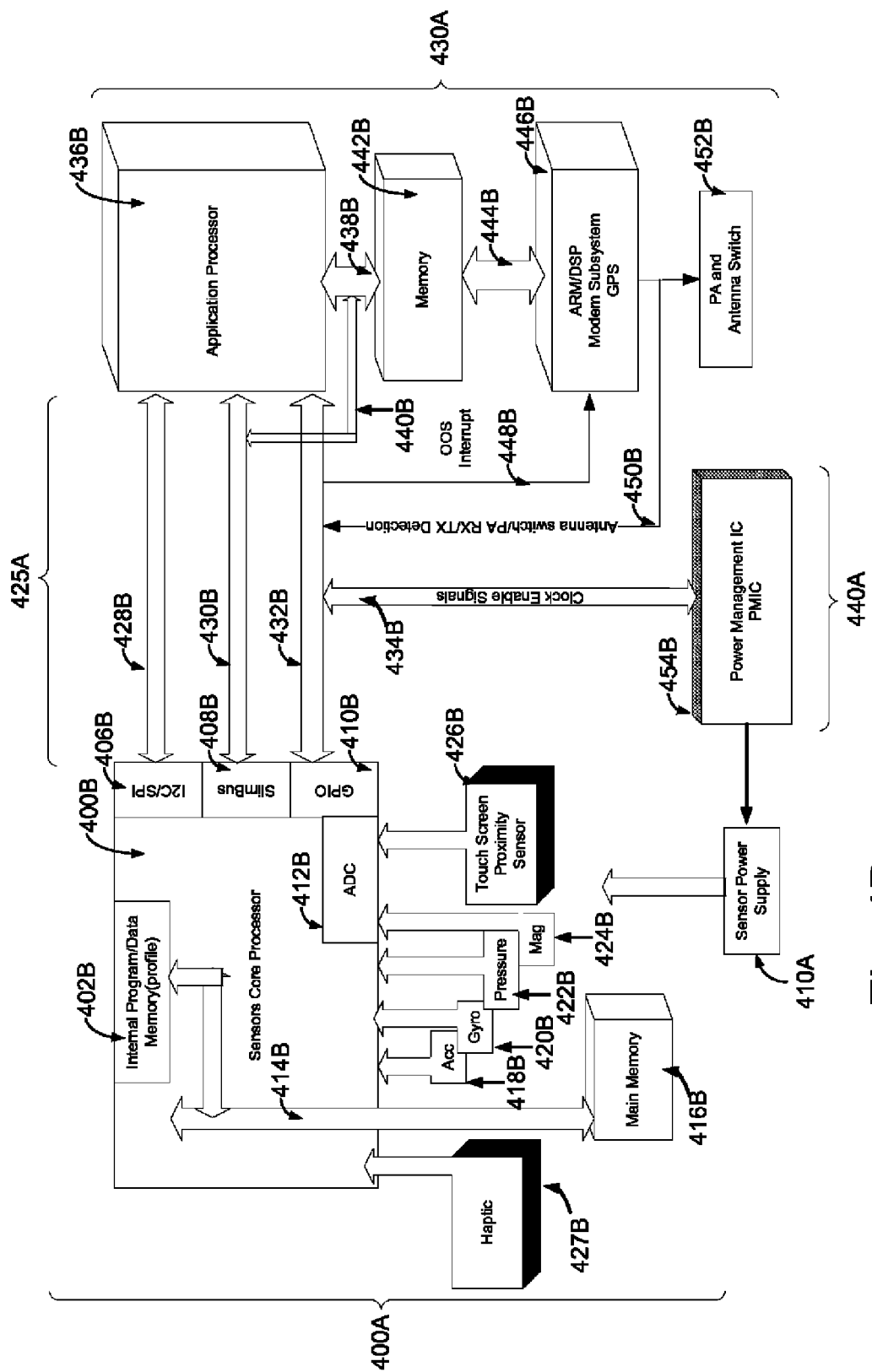
FIG. 4B shows a more detailed block diagram of an exemplary mobile device.

FIG. 4B illustrates one specific example of the architecture described above with respect to FIG. 4A. Referring to FIG. 4B, a sensor core processor 400B includes a memory 402B (e.g., including an internal data memory and an internal program memory), an Inter Integrated Circuit Bus (I2C) 406B, a Serial Low-power Inter-chip Media bus (SLIMbus) 408B, General Purpose Input Output Pins (GPIO) 410B, an analog to digital conversion (ADC) unit 412B. The memory 402B may be connected via a bus 414B to a main memory 416B that is separate from the sensor core processor 400B. The sensor software subsystem 402A will typically reside in memory 402B, but may also reside, either in part or entirely, within main memory 416B. The sensor core processor 400B may be connected to a plurality of sensors, including an accelerometer 418B, a gyroscopic sensor 420B, a pressure sensor 422B, a magnetic sensor 424B and a touch-screen proximity sensor 426B, a finger print sensor (not shown), as well as a haptic driver 427B for closed loop feedback (not shown). As will be appreciated, the sensor core processor 400B can interact with, or receive sensor data from, each of sensors 418B through 426B without having to power-up an application processor 436B. Collectively, elements 400B through 426B of FIG. 4B correspond to the sensor processing system 400A of FIG. 4A, with sensors 1 . . . N, 405A, of FIG. 4A corresponding to the sensors 418B through 426B of FIG. 4B and the module 415A corresponding to software configured to control the power and operation of sensors 418B through 426B.

The I2C 406B connects to the application processor 436B via a bus 428B, the SLIMbus 408B may connect to the application processor 436B via a bus 430B and the GPIO 410B connects to the application processor 436B via a bus 432B. The bus 432B is itself connected to a bus 434B to a power management integrated circuit (PMIC) 454B. In an example, in the direction from the PMIC 454B to the application processor 436B, the bus 434B can carry clock enable signals that are used to control hardware on the application processor 436B. The PMIC 454B can also apply dynamic voltage and frequency scaling controls to the application processor 436B and/or the modem subsystem 446B. Collectively, elements buses 428B, 430B, 432B and 434B are included in the connection 425A of FIG. 4A, and the PMIC 454B corresponds to the power management controller 440A of FIG. 4A.

The sensor processor system 402A may individually control the power of each sensor 418B, 420B 422B, 424B, 426B, etc. The sensor processor system 402A may also take advantage of different power modes which may be available depending upon the varying modes of sensor operation, and/or the requirements of the application requesting data from the sensor processor system 402A through the application processor system 430A. For example, some sensors may have limited power modes (e.g., power off and normal operation). Other sensors may allow for finer levels of control, which may change various configuration parameters such as the sampling frequency, resolution, and/or accuracy. Examples of different power modes may include low power mode, standby, normal power, high frequency, high resolution, etc. For different sensors, these may be software controlled with power down/standby bits. Sensors may be controlled through the micro-controller GPIO bus.

In one embodiment, power control to individual sensors may be provided by sensor power supply 410A to supply power for a sensor board in the sensor processor system 402A. The GPIO bus can be used to switch on-board low dropout regulators (LDOs). Individual sensors can be put standby mode using the inter integrated circuit (I2C) interface. In another embodiment, digital circuitry on board the sensor processor system 402A may be powered by the primary power supply 420A, while the sensor power is provided by the sensor power supply 410A. The power supply to analog circuitry can be turned ON/OFF using application processor 436B GPIOs. In another embodiment the digital circuitry within the sensor processor system 402A may be powered by the primary power supply 420A, while the sensors are supplied by the sensor power supply 410A. In one embodiment, for example, power to the sensors may be may be controlled using voltage regulators that can be independently turned ON/OFF using commands from the PMIC 454B, based upon what type of sensor data is being requested.

In the embodiment of FIG. 4B, the application processor 436B is illustrated as an ARM11/Scorpio processor, although it will be appreciated that the application processor 436B can correspond to a different type of processor in other embodiments of the invention. The application processor 436B connects to a memory 442B via a bus 438B. The memory 442B is connected to a modem subsystem via bus 444B. In an example, the modem subsystem 446B corresponds to an ARM/DSP processor and can include Global Positioning System (GPS) functionality, although the modem system 446B could be configured differently in other embodiments of the invention.

Further referring to FIG. 4B, the modem subsystem 446B may be connected to a power amplifier (PA) and antenna switch 452B via a bus 450B, which is also connected to the bus 432B. In an example, the bus 450B can be used to carry signaling related to antenna switch/PA reception/transmission (RX/TX) detection.

The elements 436B, 442B, 446B and 452B of FIG. 4B collectively corresponds to the application processor system 430A of FIG. 4A. Thus, it will be appreciated that the PMIC 454B can separately connect to each hardware element of the application processor system 430A for controlling the power consumption of each hardware element independently. In other words, the PMIC 454B can connect to the application processor 436B via buses 434B and 432B, the PMIC 454B can connect to the modem subsystem via buses 434B, 432B and 448B, and so on. The sensor clients may interact with the sensors module through the sensors API, which are associated with the sensor software subsystems module 415A described in more detail below.

Figure 5:
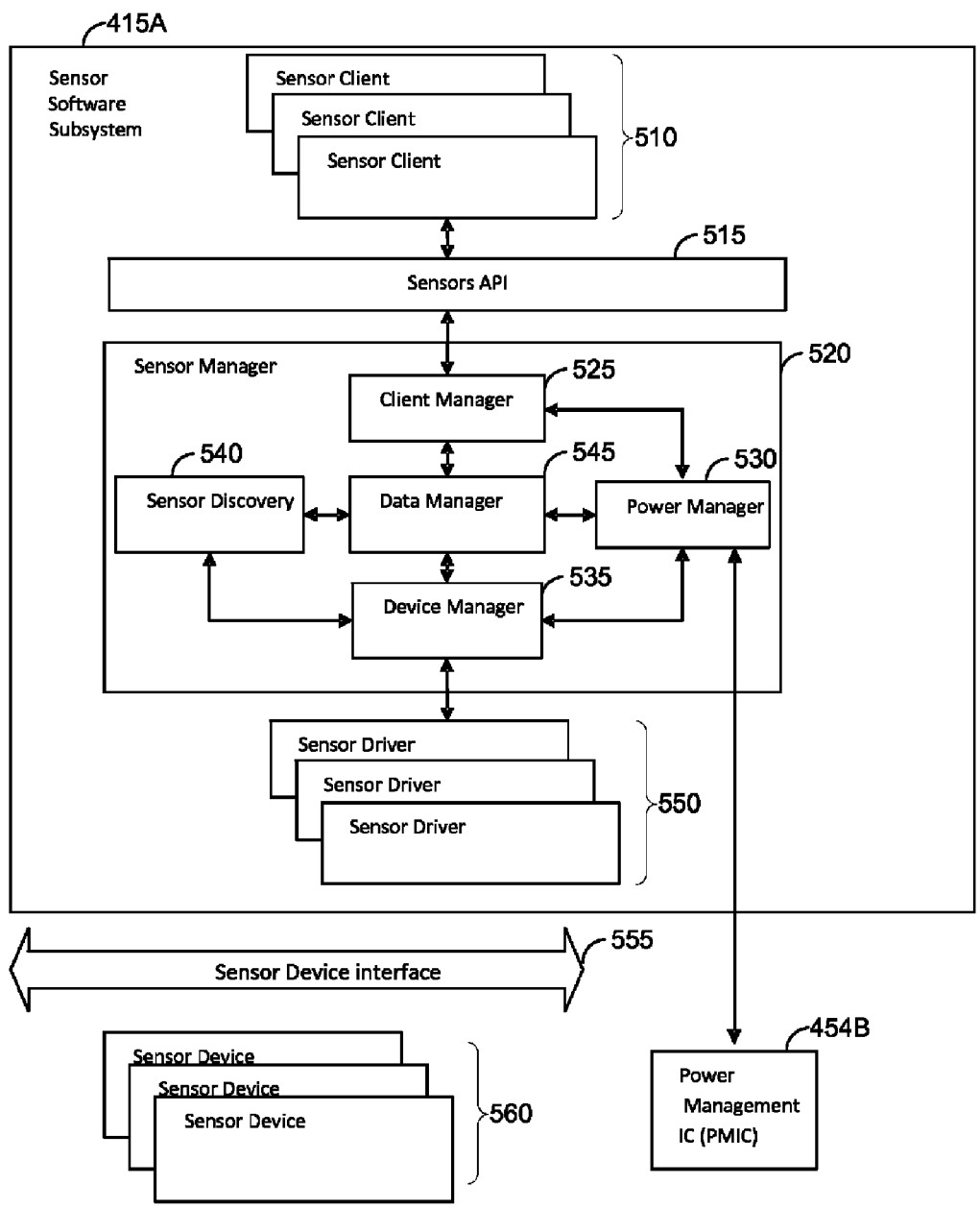
FIG. 5 is a block diagram illustrating an exemplary sensor software subsystem consistent with an embodiment of the invention.

FIG. 5 is a block diagram illustrating an exemplary sensor software subsystem 415A consistent with an embodiment of the invention. The sensor software subsystem 415A may include sensor clients 510, sensor APIs 515, a sensor manager 520 and sensor drivers 550. Within the sensor manager 520, a number of manager modules may be further included, such as a client manager 525, a sensor discover manager 540 a data manager 545 a device manager 535 and a power manager 530.

The sensor manager 520 can coordinate multiple client requests for sensor resources. Such coordination allows for smoother operation of the mobile device in the event, for example, that the sensor clients provide concurrent and/or overlapping requests for sensor data which may create resources conflicts. Such conflicts could arise when clients request include data requests for common sensors, or require more supporting resources (e.g., memory and/or processing cycles) than may be available for simultaneous client usage. The sensor manager 520 may organize client requests and allocate resources in a manner which can reduce resource conflicts. In at least one embodiment of the invention, as will be described in more detail below, the sensor manager 520 can also activate/deactivate the power to one or more sensors, and/or vary sensor operating parameters, such that overall power consumption of the mobile device may be reduced.

The sensor clients 510 include various applications that can utilize and exploit sensor data. As shown in FIG. 5, the sensor clients are shown as residing in the sensor software subsystem; however, sensor clients may also reside in other systems, including, for example, the application processor system 430A. A sensor client typically uses the Sensors API 515 to register with the sensor module and request specific sensor data-types. A sensor client may also indicate via the Sensors API 515 the periodicity of the sensor data reporting.

The client manager 525 may handle all client transactions, and interact with the sensors API 515 to receive and process client requests and send synchronous or asynchronous responses. The client manager 525 can process the registration requests from the application processor 436B and then notify the data manager of data requests for specific sensor(s) 560. Additionally, the client manager 525 may notify the power manager of registration requests. The registration process, which may be performed by the client manager 530, allows the sensor manager 520 to allocate the resources of the sensor subsystem to client applications in an orderly manner to avoid resource conflicts. For example, the sensor manager may determine priorities and timing in which sensor data and/or sensor processing resources can be provided to one or more requesting applications running on the application processor system 430A.

The data manager 545 may perform data streaming and buffering of the data being provided by one or more sensor devices 560. The data manager 545 can interact with the device manager 535 to source data from the appropriate sensor driver 550. The data manager 535 interacts with the power manager 530 for power control on data start/stop events and for data streaming rates. Additionally, the power manager 530 may control the power of individual sensor to turn ON/OFF through the power management IC 454B.

The sensor discovery module 540 may be notified by the data manager 545 if a new client request for a new data-type is received from the application processor 436B. The sensors discovery module 540 may identify the sensor that can source the requested data, and then notify the device manager 536 to initialize and configure the sensor driver 550 corresponding to the appropriate sensor device. The device manager 535 may process device/driver transactions including initialization, registration, configuration etc.

The power manager 530 may interact with the other modules in the sensor manager, namely the client manager 525, the data manager 545 and device manager 535 to operate the sensor software subsystem 415A in a power efficient manner. Client registration and data requests are used by the power manager 530 to determine sensor usage. The power manager 530 may notify the device manager 535 to configure a sensor driver 530 in the appropriate operating mode. Additionally, the power manager 530 may control the power supply to the device with the PMIC 454B using a power management IC driver API. The power management API (not shown) may reside in the application processor system 430A. The modules within the sensor manager 520 may interact with the sensor devices 560 through a sensor device interface 555.

Figure 6A:
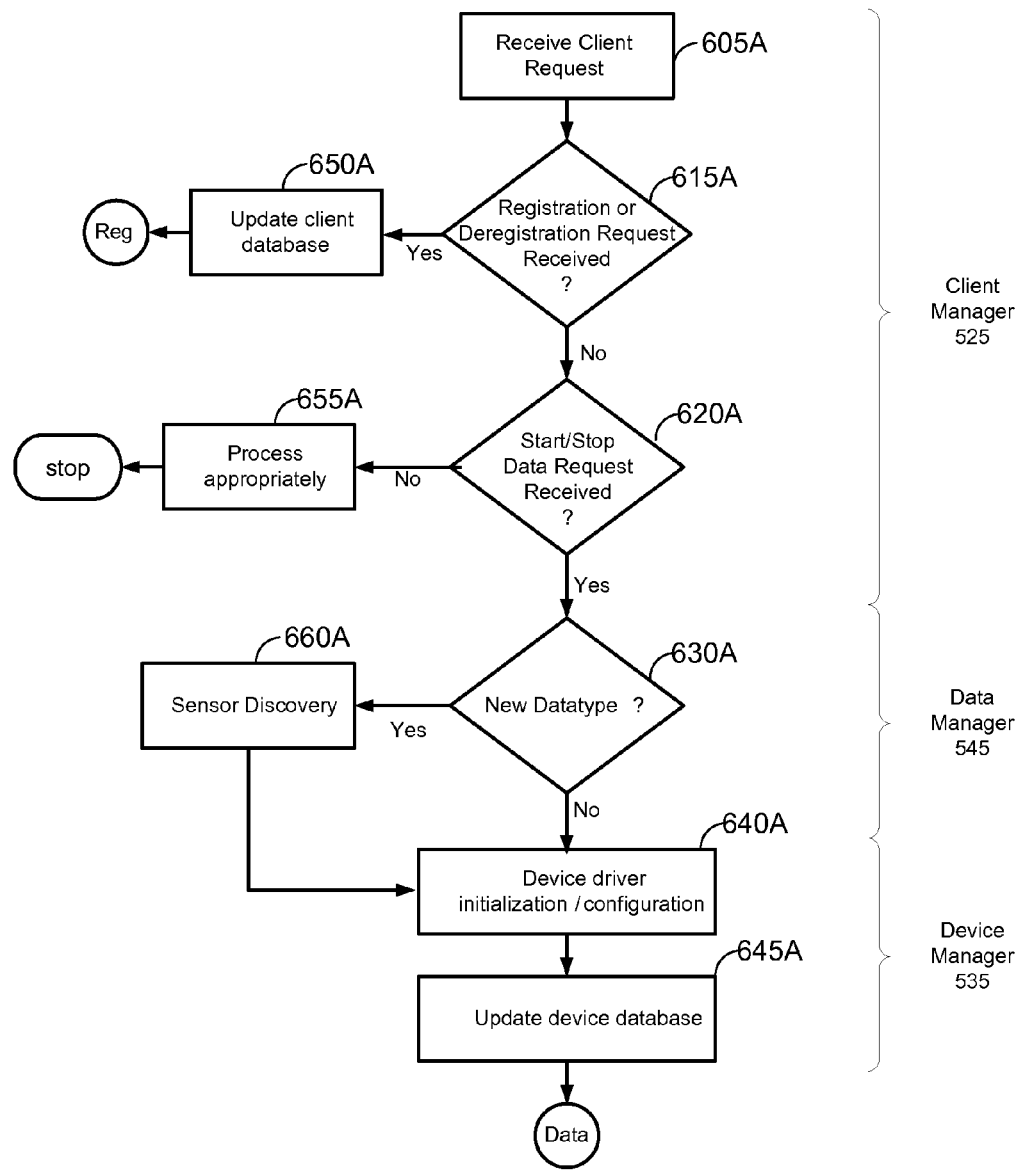
FIGS. 6A-6C are flowcharts illustrating exemplary processes consistent with at least one embodiment of the invention.
Figure 6B:
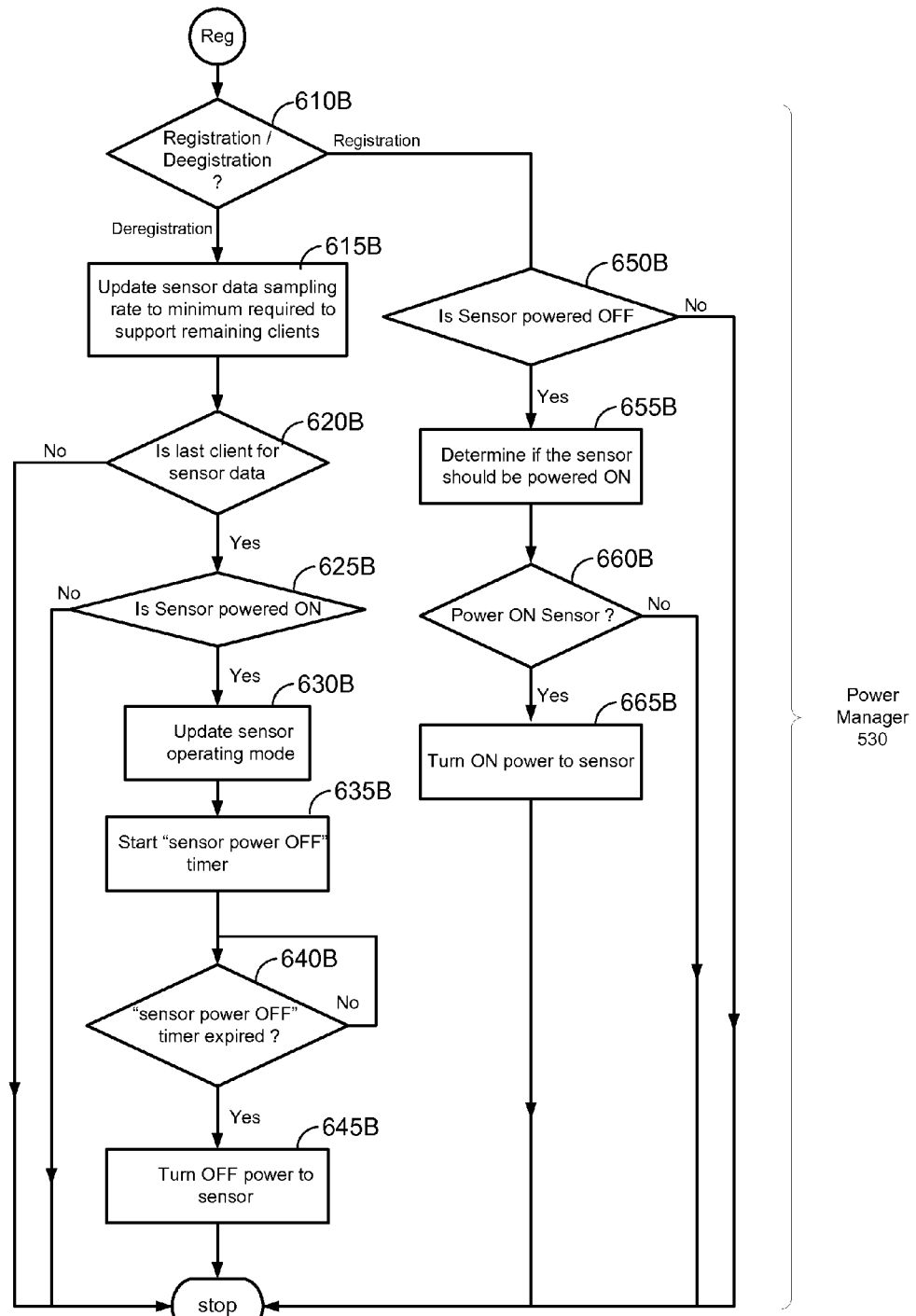
Figure 6C:
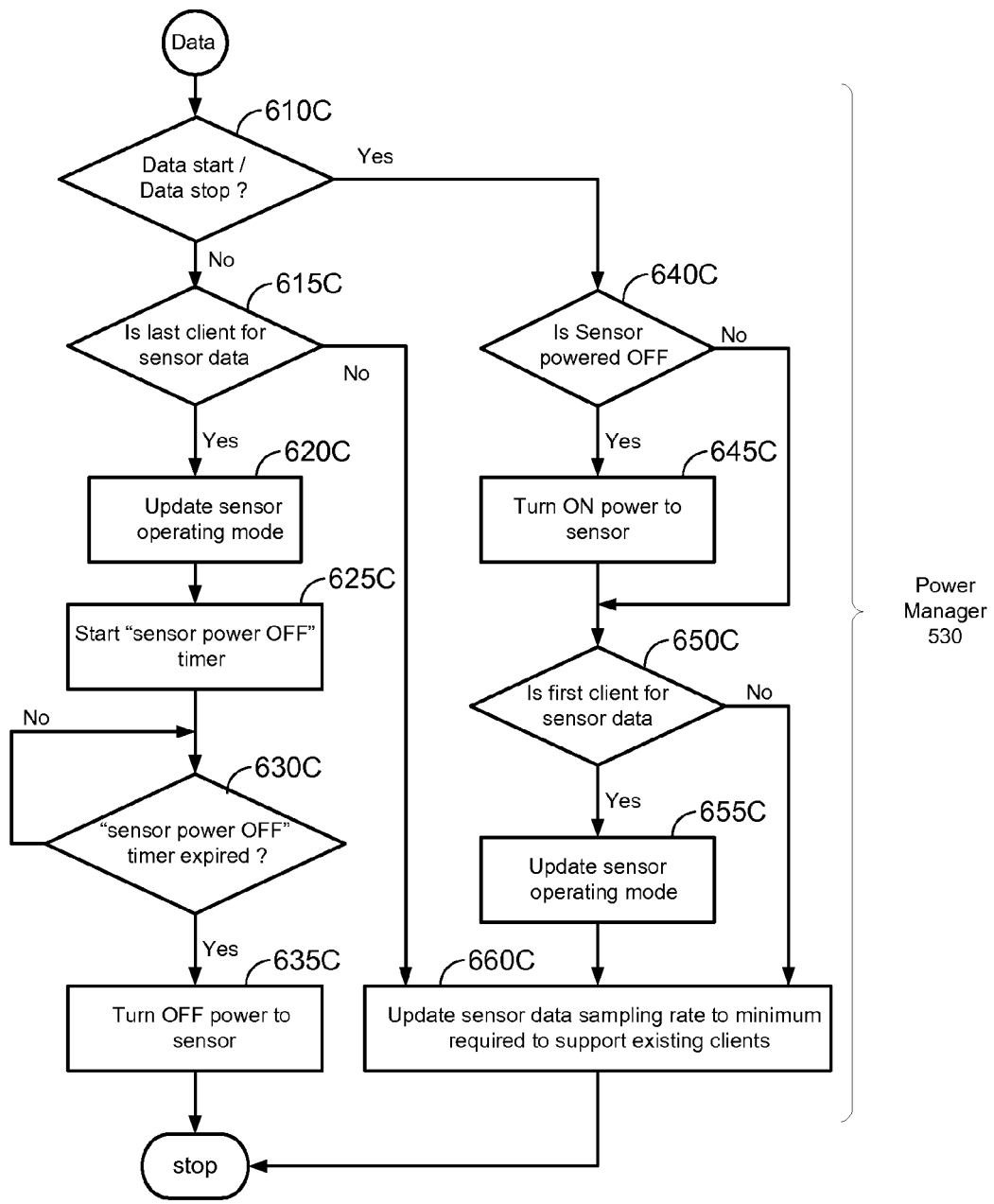

FIGS. 6A-6C are flowcharts illustrating exemplary processes consistent with at least one embodiment of the invention. The parenthetical designations along the right side of each flowchart exemplify which particular manager within the sensor manager 520 may perform the associated process blocks.

Referring to FIG. 6A, a client request 605A generated by the application processor 436B may be received at the client manager 525. The client manager 525 may then determine whether the client request includes a registration or a deregistration request (615A). If so, the client database may be updated accordingly based upon the client request (650A), and control may pass to the power manager 530 to execute a registration or deregistration process, as exemplified below in the description of FIG. 6B. The client database, for example, can maintain the state of all active clients registered in the system, maintains state of outstanding requests and how status should be reported, and store information specific to each client which has made a client request.

Alternatively, if it is determined that the received client request is not a client registration/deregistration request in block 615A, then it may be further determined whether the received client request is a stop/start request by the client application (620A). The start/stop request is a request for the appropriate sensor to either provide data or cease providing data. If the request does not include a start/stop request, then it may be processed by the sensor processor (655A) in a manner unrelated to the power management process and need not be described in detail. Alternatively, if it is determined that a start/stop request was received in block 620A, then the data manager 545 may determine whether the client request includes a request for a new data type (630A). A new data type is defined as one which has not been requested since system startup. A separate database may be contained in the data manager 545 which stores the data type and associates it with a particular sensor device. If a new data type is requested, the data manager 545 may perform sensor discovery to ascertain the source for the requested new data type (660A). After sensor discovery 660A is performed by the data manager 545, or if it is determined that the request does not include a new data type in block 630A, the device manager 535 may then initialize and/or configure the device driver for the appropriate sensor(s) (640A). The device manager 535 may then update a device database (645A). The device database may include information associating requested data types with sensors most appropriate to source the data type requested by the client. Here, the supported data types may be mapped to the appropriate sensor devices that generate the corresponding data. For example, the device database may include parameters such as operating mode, sampling rate, number of clients requesting sensor data, etc. Once the device database is updated, the process may proceed to the data collection process detailed in FIG. 6C.

If a registration or deregistration request was received by the client manager 525 as described above in block 615A, control may be transferred to the power manager 530 after registration or deregistration have been performed within the client manager 525. Referring to FIG. 6B, the power manager 530 may initially check to determine whether registration or deregistration was performed (610B). If deregistration was performed, and the client is no longer being tracked by the client manager 550 (i.e., effectively removed from further processing unless it is re-registered), the power manager 530 may update the sensor sampling rate to the minimum required to support the remaining clients (615B). The power manager 530 may then determine if whether this is the last client requesting data from a sensor (620B). If this is not the last client, processing by the power manager (550) may end.

On the other hand, if it is determined in block 620B that this is the last client requesting data from a sensor, then the power manager 530 may check to determine whether the sensor power is ON (625B). The check in block 625B may be performed because a dormant client may result in sensor being in a reduced power state wherein it may not draw any current (essentially the sensor may already be in a powered off state). If the sensor power is not ON, then the process may the processing performed by the power manager 530 may end. If it is determined in block 625B that the sensor is on, the sensor operating mode may be updated (630B) to ensure, for example, that the sensor is no longer operating in a high current mode. In another example for block 630B, the operating mode may be changed in the event the sensor is still providing data for a client that has failed to properly inform the sensor to stop providing data before deregistering. Once the operating mode is updated, the power manager 530 may then start a "sensor power OFF" timer (635B) and subsequently monitor this timer to determine if it has expired (640B). Upon expiration of the "sensor power OFF" timer, the power to the sensor is turned off (645B). The timer is used to provide a delay so that the sensor is not power cycled unnecessarily. This avoids incurring unnecessary latency, and in the case of some sensors, the startup current may be larger than the operating current, and frequent power cycling could actually use more power than simply leaving the sensor on.

Further referring to FIG. 6B, if it was determined in block 610B that registration was performed in the client manager 525, then the power manager 530 may determine if the sensor is powered off (650B). This check is performed because the sensor upon being newly registered is likely to be powered off before being used for the first time. If on the other hand the sensor is currently powered on, the processing performed by the power manager 530 may end. If the sensor is powered off, the power manager 530 may make a determination, based upon platform specific logic, that it is appropriate for the sensor should be powered on (655B). The power manager 550 may then check the result of block 660B. If it is determined appropriate in block 660B to turn on the power, the power is turned ON (665B). Otherwise, processing by the power manager 550 may end.

Referring to FIG. 6C, which illustrates an exemplary process occurring in the power manager 530 when data is being collected by a sensor. Here, the power manager 530 may initially determine whether the client request received by the client manager included a request to start sensing sensor data (610C). If so, power to the sensor is checked (640C) and turned on if needed (645C). The power manager may then determine whether this is the first client for the requested sensor data (650C). If so, the sensor operating mode is updated (655C) to initialize the sensor for the client. If not, the sensor sampling rate is updated to a minimum required to support existing clients (660C). Here, the power manager may compute the minimum sampling frequency required, or any other associated parameters, in order to reduce power consumption.

Returning to block 610C, if the power manager 530 determines that the client is requesting to stop receiving data from a sensor, a check may subsequently be determined whether this is the last client for the sensor data (615C). If it is the last client, the sensor operating mode may be updated (620C) to place it in a low current mode to reduce power consumption, and then the sensor "power OFF" timer may be started (625C). The power manager 530 checks to see whether the sensor "power OFF" is expired (630C), and if so, powers the sensor off (635C). If the power manger 530 determines in block 615C that this is not the last client for the sensor data, the sensor data sampling rate may be updated to the minimum required to support the outstanding client requests in step 660C. Because there can be more than one client concurrently interested in obtaining data from a specific sensor, the rate at which the sensor device can be sampled can be reduced to a value that can adequately support all existing clients for power optimization.

Figure 7:
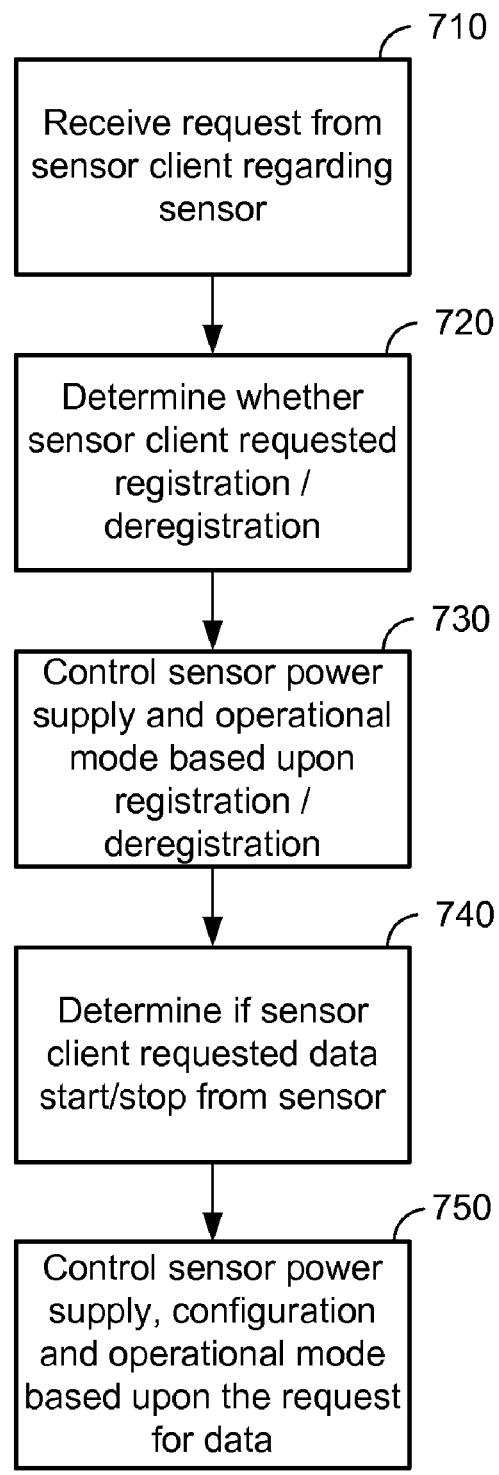
FIG. 7 is a flowchart illustrating a top-level process consistent with at least one embodiment of the invention.

FIG. 7 is a flowchart illustrating a top-level process 700 consistent with at least one embodiment of the invention. Initially, a request from a sensor client regarding a sensor may be received (710). This request may include various commands by the client associated with one or more sensors. A determination may then be made whether the sensor client request registration or deregistration (720). This determination indicates whether the client has registered with sensor, or has been deregistered with the sensor. The registration/deregistration actions may be performed based upon commands included the received request. The power supply and operational modes of the sensor may be controlled based upon the registration/deregistration determination at block 720 (730). This control is effectuated in order to reduce power consumption of the sensor. It may then be determined whether the sensor client provided a start/stop request for data from the sensor (740). Finally, power to the sensor, a configuration, and/or an operational mode of the sensor may be controlled based upon the start/stop request for data (750). This control is effectuated in order to reduce power consumption of the sensor.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for managing power consumption of a plurality of sensors within a mobile device. The method may include receiving a request from a sensor client regarding a sensor, determining whether the sensor client requested registration/deregistration, controlling a power supply and an operational mode of the sensor, based upon the registration/deregistration request, for reducing power consumption of the sensor, determining whether the sensor client provided a start/stop request for data from the sensor, and controlling power to the sensor, a device/driver configuration, and an operational mode of the sensor, based upon the start/stop request for data, for reducing the power consumption of the sensor. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for managing power consumption of a plurality of sensors within a mobile device, comprising:
   receiving a request from a sensor client regarding a sensor;
   determining whether the sensor client requested registration/deregistration;
   controlling a power supply and an operational mode of the sensor, based upon the registration/deregistration request, for reducing power consumption of the sensor;
   determining whether the sensor client provided a start/stop request for data from the sensor; and
   controlling power to the sensor, a device/driver configuration, and an operational mode of the sensor, based upon the start/stop request for data, for reducing the power consumption of the sensor.

2. The method of claim 1, further comprising:
   determining that the request includes a registration or deregistration request; and
   updating a client database and performing registration or deregistration of the sensor.

3. The method of claim 2, further comprising:
   ascertaining that registration has been performed;
   determining whether the sensor is powered off; and
   determining if the sensor should be powered on, and if so, turning the sensor power on.

4. The method of claim 2, further comprising:
   ascertaining that deregistration has been performed;
   updating the sensor data sampling rate to a minimum capable of supporting existing clients;
   updating the sensor parameters to support existing clients;
   updating the sensor operating mode; and
   turning the sensor power off if the request is the last client request.

5. The method of claim 4, further comprising:
   ascertaining that the request is the last client request and the sensor is powered on;
   starting a sensor power off timer;
   determining whether the sensor power off time has expired; and
   powering down the sensor upon expiration of the power off timer.

6. The method of claim 1, further comprising:
   determining that the sensor client provided a start data request;
   determining whether the sensor is powered off, and powering on the sensor if the sensor is powered off;
   determining that the sensor client is a first sensor client for the sensor;
   updating a sensor operating mode; and
   updating a sensor sampling frequency to a minimum to support existing clients.

7. The method of claim 1, further comprising:
   determining that the sensor client provided a stop data request; and
   determining that the sensor client is not the last client associated with the sensor, and updating the sensor sampling frequency to a minimum to support the existing clients.

8. The method of claim 1, further comprising:
   determining that the sensor client provided a stop data request;
   determining that the sensor client is the last client associated with the sensor;
   updating a sensor operating module;
   starting a sensor "power off" timer; and
   turning the sensor power off when the sensor "power off" timer expires.

9. An apparatus for managing power consumption of at least one sensor within a mobile device, comprising:
   a processor;
   a power supply coupled to the processor;
   at least one sensor coupled to the power supply; and
   a memory coupled to the processor, wherein the memory comprises instructions for causing the processor to
      receive a request from a sensor client regarding a sensor,
      determine whether the sensor client requested registration/deregistration,
      control a power supply and an operational mode of the sensor, based upon the registration/deregistration request, for reducing power consumption of the sensor,
      determine whether the sensor client provided a start/stop request for data from the sensor, and
      control power to the sensor, a device/driver configuration, and an operational mode of the sensor, based upon the start/stop request for data, for reducing the power consumption of the sensor.

10. The apparatus of claim 9, wherein the memory further comprises instructions causing the processor to
    determine that the request includes a registration or deregistration request; and
    update a client database and performing registration or deregistration of the sensor.

11. The apparatus of claim 10, wherein the memory further comprises instructions causing the processor to
    ascertain that registration has been performed;
    determine whether the sensor is powered off; and
    determine if the sensor should be powered on, and if so, turning the sensor power on.

12. The apparatus of claim 10, wherein the memory further comprises instructions causing the processor to
    ascertain that deregistration has been performed;
    update the sensor data sampling rate to a minimum capable of supporting existing clients;
    update the sensor parameters to support existing clients;
    update the sensor operating mode; and
    turn the sensor power off if the request is the last client request.

13. The apparatus of claim 12, wherein the memory further comprises instructions causing the processor to
    ascertain that the request is the last client request and the sensor is powered on;
    start a sensor power off timer;
    determine whether the sensor power off time has expired; and
    power down the sensor upon expiration of the power off timer.

14. The apparatus of claim 9, wherein the memory further comprises instructions causing the processor to
    determine that the sensor client provided a start data request;
    determine whether the sensor is powered off, and powering on the sensor if the sensor is powered off;
    determine that the sensor client is a first sensor client for the sensor;
    update a sensor operating mode; and
    update a sensor sampling frequency to a minimum to support existing clients.

15. The apparatus of claim 9, wherein the memory further comprises instructions causing the processor to
    determine that the sensor client provided a stop data request; and determine that the sensor client is not the last client associated with the sensor, and updating the sensor sampling frequency to a minimum to support the existing clients.

16. The apparatus of claim 9, wherein the memory further comprises instructions causing the processor to
determine that the sensor client provided a stop data request;
determine that the sensor client is the last client associated with the sensor;
update a sensor operating module;
start a sensor "power off" timer; and
turn the sensor power off when the sensor "power off" timer expires.

17. A non-transitory computer-readable storage medium comprising instructions, which, when executed by at least one processor, cause the processor to manage power consumption of a plurality of sensors within a mobile device, comprising:
instructions to receive a request from a sensor client regarding a sensor;
instructions to determine whether the sensor client requested registration/deregistration;
instructions to control a power supply and an operational mode of the sensor, based upon the registration/deregistration request, for reducing power consumption of the sensor;
instructions to determine whether the sensor client provided a start/stop request for data from the sensor; and
instructions to control power to the sensor, a device/driver configuration, and an operational mode of the sensor, based upon the start/stop request for data, for reducing the power consumption of the sensor.

18. The non-transitory computer-readable storage medium of claim 17, further comprising:
instructions to determine that the request includes a registration or deregistration request; and
instructions to update a client database and performing registration or deregistration of the sensor.

19. The non-transitory computer-readable storage medium of claim 18, further comprising:
instructions to ascertain that registration has been performed;
instructions to determine whether the sensor is powered off; and
instructions to determine if the sensor should be powered on, and if so, turning the sensor power on.

20. The non-transitory computer-readable storage medium of claim 18, further comprising:
instructions to ascertain that deregistration has been performed;
instructions to update the sensor data sampling rate to a minimum capable of supporting existing clients;
instructions to update the sensor parameters to support existing clients;
instructions to update the sensor operating mode; and
instructions to turn the sensor power off if the request is the last client request.

21. The non-transitory computer-readable storage medium of claim 20, further comprising:
instructions to ascertain that the request is the last client request and the sensor is powered on;
instructions to start a sensor power off timer;
instructions to determine whether the sensor power off time has expired; and
instructions to power down the sensor upon expiration of the power off timer.

22. The non-transitory computer-readable storage medium of claim 17, further comprising:
instructions to determine that the sensor client provided a start data request;
instructions to determine whether the sensor is powered off, and powering on the sensor if the sensor is powered off;
instructions to determine that the sensor client is a first sensor client for the sensor;
instructions to update a sensor operating mode; and
instructions to update a sensor sampling frequency to a minimum to support existing clients.

23. The non-transitory computer-readable storage medium of claim 17, further comprising:
instructions to determine that the sensor client provided a stop data request; and
instructions to determine that the sensor client is not the last client associated with the sensor, and update the sensor sampling frequency to a minimum to support the existing clients.

24. The non-transitory computer-readable storage medium of claim 17, further comprising:
instructions to determine that the sensor client provided a stop data request;
instructions to determine that the sensor client is the last client associated with the sensor;
instructions to update a sensor operating module;
instructions to start a sensor "power off" timer; and
instructions to turn the sensor power off when the sensor "power off" timer expires.

25. An apparatus for managing power consumption of a plurality of sensors within a mobile device, comprising:
means for receiving a request from a sensor client regarding a sensor;
means for determining whether the sensor client requested registration/deregistration;
means for controlling a power supply and an operational mode of the sensor, based upon the registration/deregistration request, for reducing power consumption of the sensor;
means for determining whether the sensor client provided a start/stop request for data from the sensor; and
means for controlling power to the sensor, a device/driver configuration, and an operational mode of the sensor, based upon the start/stop request for data, for reducing the power consumption of the sensor.

26. The apparatus of claim 25, further comprising:
means for determining that the request includes a registration or deregistration request; and
means for updating a client database and performing registration or deregistration of the sensor.

27. The apparatus of claim 26, further comprising:
means for ascertaining that registration has been performed;
means for determining whether the sensor is powered off; and
means for determining if the sensor should be powered on, and if so, turning the sensor power on.

28. The apparatus of claim 26, further comprising:
means for ascertaining that deregistration has been performed;
means for updating the sensor data sampling rate to a minimum capable of supporting existing clients;
means for updating the sensor parameters to support existing clients;

means for updating the sensor operating mode; and
means for turning the sensor power off if the request is the last client request.

29. The apparatus of claim 28, further comprising:
ascertaining that the request is the last client request and the sensor is powered on;
starting a sensor power off timer;
determining whether the sensor power off time has expired; and
powering down the sensor upon expiration of the power off timer.

30. The apparatus of claim 25, further comprising:
means for determining that the sensor client provided a start data request;
means for determining whether the sensor is powered off, and powering on the sensor if the sensor is powered off;
means for determining that the sensor client is a first sensor client for the sensor;
means for updating a sensor operating mode; and
means for updating a sensor sampling frequency to a minimum to support existing clients.

31. The apparatus of claim 25, further comprising:
means for determining that the sensor client provided a stop data request; and
means for determining that the sensor client is not the last client associated with the sensor, and updating the sensor sampling frequency to a minimum to support the existing clients.

32. The apparatus of claim 25, further comprising:
means for determining that the sensor client provided a stop data request;
means for determining that the sensor client is the last client associated with the sensor;
means for updating a sensor operating module;
means for starting a sensor "power off" timer; and
means for turning the sensor power off when the sensor "power off" timer expires.

* * * * *